Figure 1:
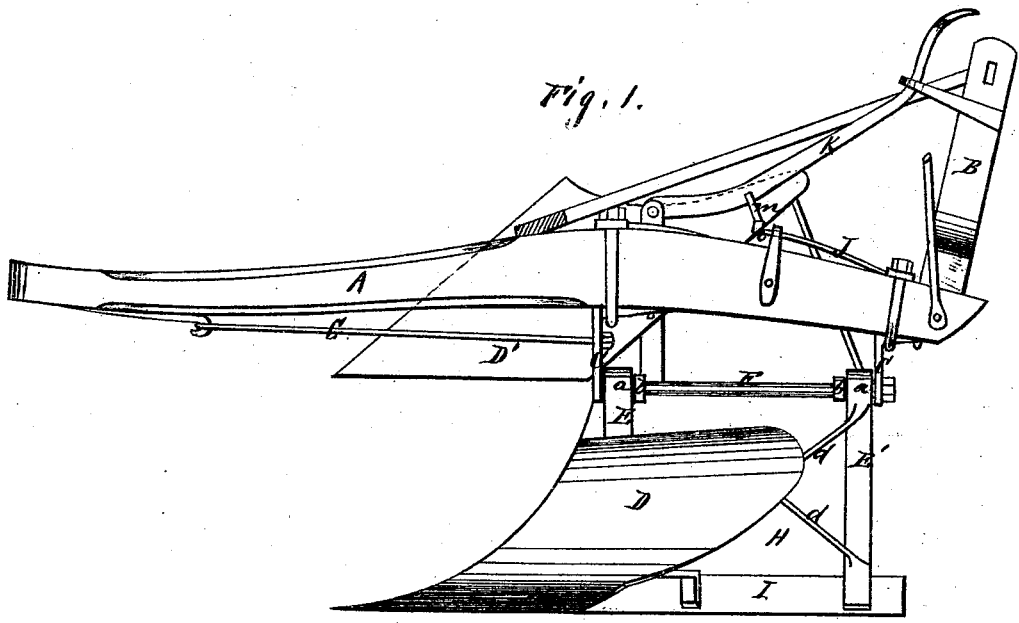
Figure 2:
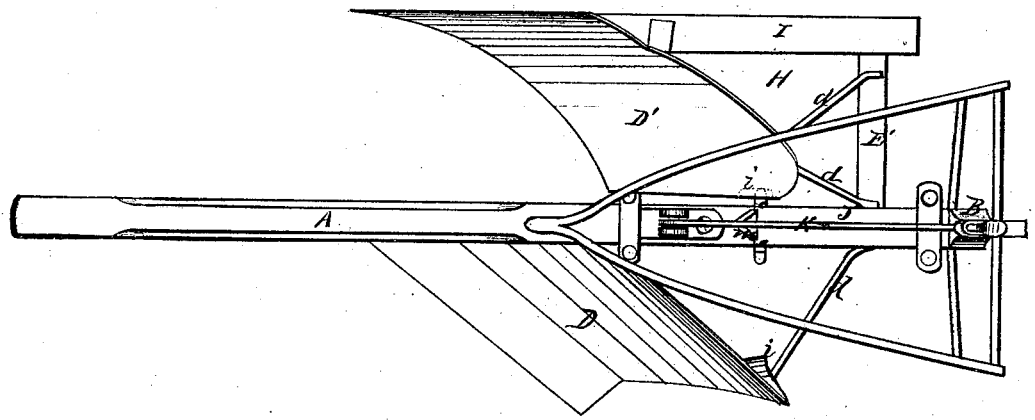

J. P. Pritchard,

Plow.

No. 111,247.  Patented Jan. 24, 1871.

Witnesses.
Geo. H. Strong
Wm R Bogue

Inventor.
J. P. Pritchard
By his Atty's
Dewey & Co

UNITED STATES PATENT OFFICE.

JACKSON P. PRITCHARD, OF CONN VALLEY, CALIFORNIA.

IMPROVEMENT IN PLOWS.

Specification forming part of Letters Patent No. 111,247, dated January 24, 1871; antedated January 14, 1871.

*To all whom it may concern:*

Be it known that I, JACKSON P. PRITCHARD, of Conn Valley, county of Napa, State of California, have invented an Improved Side-Hill Plow; and I do hereby declare the following description and accompanying drawings are sufficient to enable any person skilled in the art or science to which it most nearly appertains to make and use my said invention or improvements without further invention or experiment.

My improvements relate to that class of side-hill plows in which two plows are attached to a shaft upon which they can be revolved so as to convert it into a right or left hand plow, as required.

My plow can be used for cultivating prairie or level land, using either the right or left hand plow for this purpose.

In the following description reference is had by letters to the accompanying drawings, forming a part of this specification, in which—

A represents an ordinary plow-beam, having the upright post B firmly secured at its rear end in the usual manner of constructing plows. On the under side of this beam I secure by bolts or clips, as shown, the two rectangular plates C, at the proper or desired distance apart, so that one arm of each plate will project downward.

The plows D D' have the front and rear standards, E E', attached to the landside in the usual manner. The upper ends of the standards of both plows are united together, and boxes *a* are formed at the junction, as described. The two plows will then be united together at an angle a little greater than a right angle. The boxes *a* turn upon a shaft, F, which bears in the downward - projecting arm of the rectangular plates C, and collars *b* are formed on the shaft, between which and the arms the boxes turn. A strengthening-rod, G, extends from the forward plate, C, to near the front end of the beam, as shown.

The space between the standards E E' is closed by a plate, H, which simply forms an extension of the landside I, and which serves to prevent the dirt or other substance from getting behind the share and clogging the plow. This plate may extend but a portion of the way or the entire distance, as shown. Braces *d d* extend from the rear standard to the upper corner of the mold-board, and serve to strengthen the plow.

Upon the upper side of the beam A, and in front of the upright post B, is a flat or other spring, J, its rear end secured by clips or bolts, as desired. At the front end of this spring is a cross-bar, *e*, which is provided with catches at each end. These catches engage with a projection, *i*, on the under side of the mold-board, and retain the idle plow in its place while the other one is being worked.

A lever, K, is secured by a pivot directly in front of the spring J, and extends back to the upper end of the post B in a convenient position to be reached by the person holding the plow. A lug, *m*, on this lever bears upon the end of the spring J, so that by bearing down upon the end of the lever the spring is lowered and the catches disengaged from the projection *i*, when the position of the plows can be reversed.

When the plow is at work one of the plows will be carried at a position approximating to a right angle to the other, and be held in that position by the catch on the cross-bar *e*, and when it is desired to reverse them the plow is allowed to turn until both landsides rest upon the ground, when by releasing the catch by means of the lever K the beam and handles can be turned to the opposite side and the position of the plows changed without stopping the team and without effort on the part of the plowman.

Having thus described my invention, what I claim, and desire to secure by Letters Patent, is—

In combination with the plows D and D', connected and arranged as above claimed, the holding device consisting of the spring J and cross-piece *e*, operated by the lever K, substantially as specified.

In witness that the above-described invention is claimed by me I have hereunto set my hand and seal.

JACKSON P. PRITCHARD. [L. S.]

Witnesses:
GEO. H. STRONG,
WM. R. BOONE.